United States Patent [19]

Pripps et al.

[11] Patent Number: 5,752,714
[45] Date of Patent: May 19, 1998

[54] SIDE-IMPACT AIRBAG ASSEMBLY

[75] Inventors: Steven R. Pripps, North Ogden; Mark L. Enders, Ogden, both of Utah; Davin G. Saderholm, Bietigheim-Bissingen, Germany; Scott A. Meyer, Orion; Timothy M. Maly, Plymouth, both of Mich.

[73] Assignee: Morton International, Inc., Chicago, Ill.

[21] Appl. No.: 832,287

[22] Filed: Apr. 3, 1997

[51] Int. Cl.$^6$ ........................................ B60R 21/22
[52] U.S. Cl. .......................... 280/730.2; 280/730.1; 280/728.3
[58] Field of Search ..................... 280/730.2, 730.1, 280/728.3

[56] References Cited

U.S. PATENT DOCUMENTS

| | | | |
|---|---|---|---|
| 5,533,750 | 7/1996 | Karlow et al. | 280/730.2 |
| 5,536,038 | 7/1996 | Bollaert et al. | 280/730.2 |
| 5,540,460 | 7/1996 | Wipasuramonton | 280/730.1 |
| 5,542,691 | 8/1996 | Marjanski et al. | 280/728.2 |
| 5,553,887 | 9/1996 | Karlow et al. | 280/730.2 |
| 5,556,127 | 9/1996 | Hurford et al. | 280/730.2 |
| 5,564,739 | 10/1996 | Davidson | 280/736 |
| 5,669,627 | 9/1997 | Marjanski et al. | 280/728.3 |
| 5,690,354 | 11/1997 | Logan et al. | 280/728.2 |

*Primary Examiner*—Christopher P. Ellis
*Attorney, Agent, or Firm*—George W. Rauchfuss, Jr.

[57] ABSTRACT

Assembly is adapted to mount on an internal structural member of a vehicle seat, the seat having a seat body formed with a recess and having a trim cover formed with a frangible opening to said recess. The invention also includes a one-piece resilient plastic deployment door anchored on the structural member and curving over a folded, inflatable airbag cushion and inflator module to comprise a rounded surface smoothly overlayable by the seat trim cover. The door has a distal edge approximately alignable with the frangible access to assist in the opening of the frangible access during deployment of the airbag cushion.

20 Claims, 2 Drawing Sheets

SIDE-IMPACT AIRBAG ASSEMBLY

FIELD OF THE INVENTION

This invention relates to a side-impact airbag assembly for installation in a recess in a seat so that the airbag cushion will deploy between an occupant and the side of a vehicle. More specifically, this invention relates to such an assembly having an internal deployment door adapted to cover the recess opening and to underlie the seat trim cover in a way that it conforms to the shape and "feel" of the seat and does not disturb the shape and feel of the seat, yet also provides for a more reliable deployment of the airbag cushion through the intended access opening in the seat trim cover.

BACKGROUND OF THE INVENTION

The prior art includes patents on side-impact airbag modules or assemblies disposed in an automobile seat between the vehicle occupant and the vehicle door. Such modules have included an assembly of an inflator connected to an airbag, with the assembly being secured to a structural element of the seat. Such modules have been "dressed" or completely surrounded in a rigid thermoplastic cover predesigned to conform, as much as reasonably possible for such a rigid cover, to the surrounding area of the seat and to underlie the seat trim cover and have a shape, that as near as possible, produces a smooth seat shape in the area of the module. It has often been the case, however, that the cover of the module has not conformed with the adjacent shape of the seat and has produced noticeable bulges or other deformities. Additionally, a different rigid cover must be produced for each different airbag/inflator assemblies.

The intention in the past has also been to produce an airbag module which, in deployment, will burst through the seat trim cover either by ripping open the trim cover fabric, by tearing the seat trim cover open along a tear line, or by splitting a seam in the seat trim cover. However, the opening of past units often has been unpredictable, that is, it may or may not occur at the intended location in the seat trim cover fabric. Needless to say, such unpredictability, affecting the performance of the airbag deployment, is highly undesirable.

There has been a need for a side-impact airbag assembly housed in a recess in the vehicle seat in which the shape of the seat trim cover in the area is essentially unaffected. Additionally, such an assembly should assist in the predictable opening of the seat trim cover upon deployment of the airbag. Further, it is highly desirable that such an assembly has an internal deployment door providing the aforesaid benefits yet can be employed with a wide variety of airbag/inflator assemblies without requiring modifications of the internal deployment door.

SUMMARY OF THE INVENTION

The present invention addresses this need. There is provided a side-impact airbag module assembly adapted to mount on an internal structural member of a vehicle seat, the seat having an internal cushion formed with a recess therein and having a trim cover defining a frangible access opening to said recess. The assembly includes a folded, inflatable airbag cushion and an inflator connected together so that when activated, the airbag cushion will be deployed by being inflated by inflation gas from the inflator. The invention also includes a bracket securable to the internal structural member and a one-piece or unitary resilient plastic deployment door anchored on the bracket and curving over the folded airbag cushion and inflator to comprise a rounded surface overlayable by the seat trim cover. The resulting structure presents a smoothly blended shape to conform with the shape of adjacent parts of the seat, particularly the shape of the seat trim cover. The deployment door has a distal or terminal edge approximately alignable with the frangible opening in the seat trim cover to assist in rupturing the frangible access opening and permit deployment of the inflating airbag through said opening.

BRIEF DESCRIPTION OF THE DRAWINGS

Other objects and features of the invention will be apparent to those skilled in the art from a study of the following specification with reference to the drawings, all of which disclose an illustrative, but non-limiting, embodiment of the invention.

In the Drawings

DESCRIPTION OF THE PREFERRED EMBODIMENT

Figure 1:
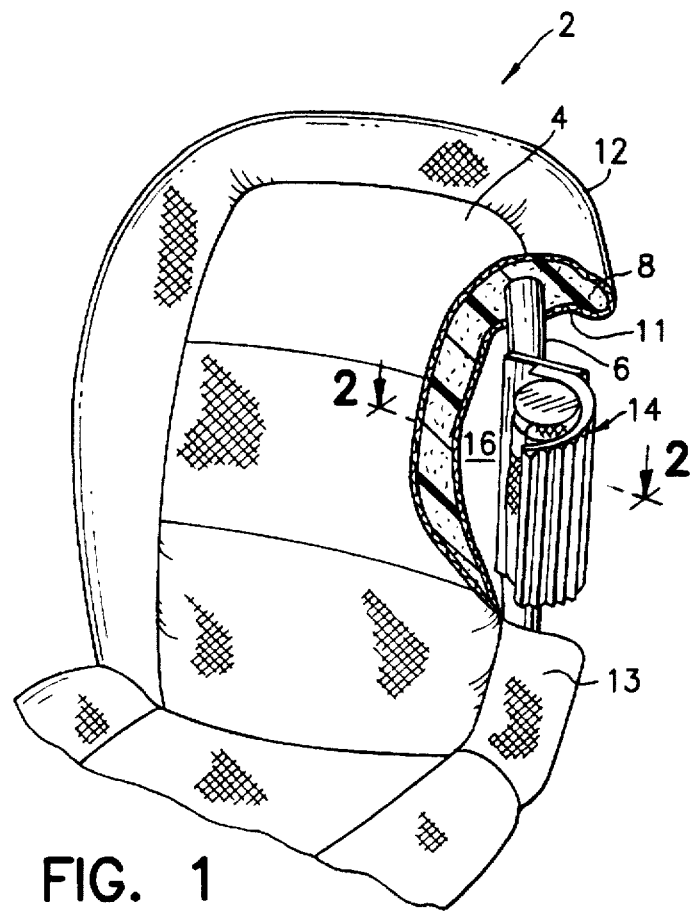
FIG. 1 is a fragmentary perspective view of a vehicle seat partly broken away to expose an assembly embodying the invention.

A vehicle seat embodying the invention is shown in FIG. 1 by reference numeral 2. The seat comprises a seat back 4 having an internal structural element 6 located in a foam cushion body 8, with the foam body being covered with a seat trim or finish cover 12 generally leather or synthetic fabric. An airbag cushion assembly of the present invention is designated generally by reference numeral 14 and is disposed in a recess 16 in foam body 8.

Figure 2:
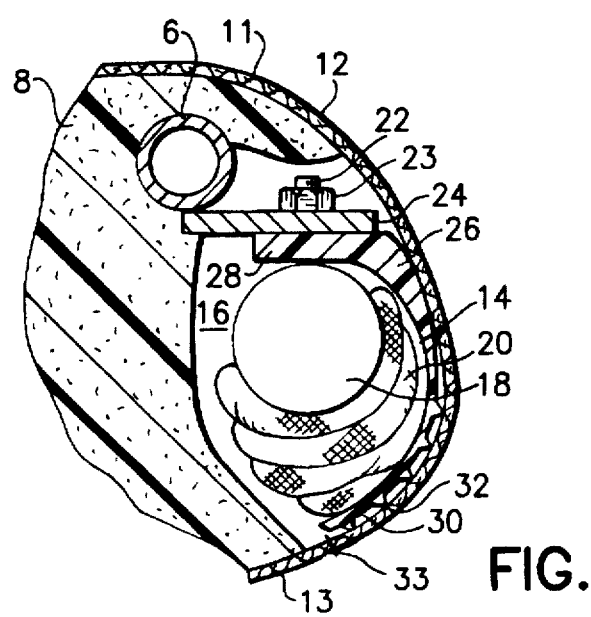
FIG. 2 is an enlarged sectional view on the line 2—2 of FIG. 1 when the module is installed on a completed seat.

The airbag assembly 14 comprises (FIG. 2) a module defined by an inflator 18, preferably of cylindrical shape, and a folded inflatable airbag cushion 20. This module may be shrink-wrapped in a clear plastic. On one side of the inflator 18 are a pair of longitudinally spaced attaching studs 22 (only one being shown). The assembly further preferably comprises a bracket or mount plate 24 which is preferably rectangular and is secured to the structural element 14 by any suitable means, such as by welding thereto or by being suitably retained in a retaining slot or opening in the structural element. The plate is suitably apertured to receive the studs 22.

Figure 4:
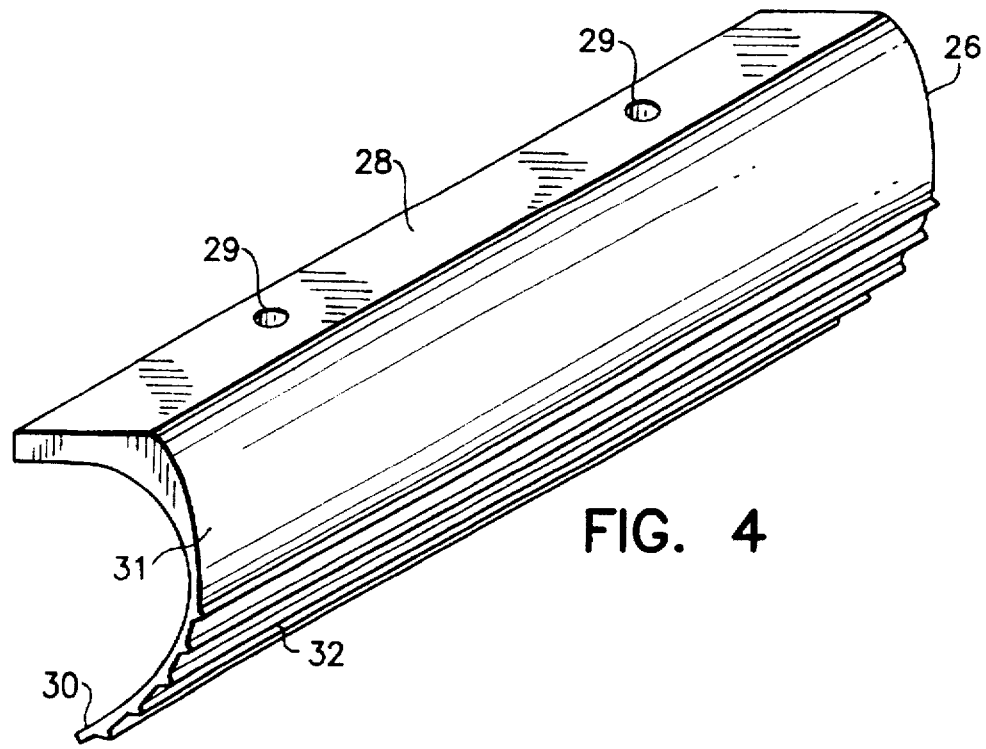
FIG. 4 is an enlarged perspective view of a deployment door of the invention.

A deployment door 26, the focus of the invention, (FIG. 2) is further provided. The door 26 is in the form of a sheet-like flap (FIG. 4) molded from thermoplastic resin. The door 26 has a generally J-shaped longitudinal cross-section and includes a thickened securing margin 28 which is apertured with openings 29 (FIG. 4) to receive the studs 22 intermediate the inflator 18 and the bracket 24. In installation the studs 22 of the inflator 18 are threaded through the apertures 29 in the door 26 and the bracket 24 and receive nuts 23 as shown. When the nuts 23 are fully tightened, the securing margin 28 of the deployment door 26 will be clamped between the inflator 18 and the bracket 24. The module is thus secured in place on structural element 6 of the seat 2. It will be appreciated that instead of studs 22 and bracket 24 other attachment means may be utilized to secure the module and door to the internal structural element of the seat. For example the inflator or a housing for the inflator may be provided with suitable securing protrusions that when inserted into complementary openings in the structural element act to lock the module and door in place.

The deployment door 26, from the securing margin 28, tapers toward its distal edge 30 to become more resilient and flexible. This portion 31 of the door 26 is flexible so that it can be shaped to curve around the inflator 18 and cushion 20 of module 14 to provide a cover for the recess 16. The flexible portion 31 of the deployment door 26 thus can readily be made to generally conform to the shape of surrounding areas of the seat, that is, it can readily be made to conform to the desired exterior profile of the seat trim cover 12 and also it closes up the recess 16 at the same time. As an example, the thickened margin portion 28 of the deployment door 26 may have a thickness of about 3 mils while more flexible portion 31 may have a thickness of about 2 mils.

Preferably, the deployment door 26 is made of a plastic material which is rigid in its thicker securing margin section 28 and flexible in thinner section 31. For instance, it may be made from any suitable thermoplastic elastomeric polymer having a relatively low flexural modulus of elasticity. Examples of such thermoplastic polymers usable in this invention include, for example, Telcar, a polyolefin polymer available from Technor Apex Co; Bexloy, a polybutylene terephthalate polyethylene alloy from E.I. DuPont de Nemours; or Santoprene, a thermoplastic polyolefin elastomeric polymer available from Advanced Elastomer Systems. The deployment door can be made from a single thermoplastic resin or two thermoplastic resins of different flexural stiffness. The deployment door can be made from a single resin by a one shot injection molding process or from two different resins in a two shot injection molding process. Also, the deployment door could be extruded from a single resin or extruded from two different resins in a dual extrusion process.

The exterior seat trim cover 12, which may be of woven fabric, curves around from a portion 11 at the rear of the seat 2 and to a portion 13 at the front of the seat in a smooth curve. A frangible access opening 33 is provided in the outer seat trim cover 12 at the location desired for deployment of the airbag cushion. The frangible access opening may be rupturable stitching in the trim cover fabric 12 or a suitable tear seam provided in the trim cover fabric. The deployment door 26 is sized to have its distal edge 30 adjacent the frangible access opening 33 in the seat trim cover 12. The deployment door 26 is sufficiently stiff so as not to be easily displaced in the area adjacent frangible access opening 33, yet flexible enough to give way to normal hand pressure with about the same resilience as adjacent portions of the seat trim cover 12. The stiffly resilient nature of the deployment door 26 may be regarded as protection for the airbag cushion from long term wear and tear.

Figure 3:
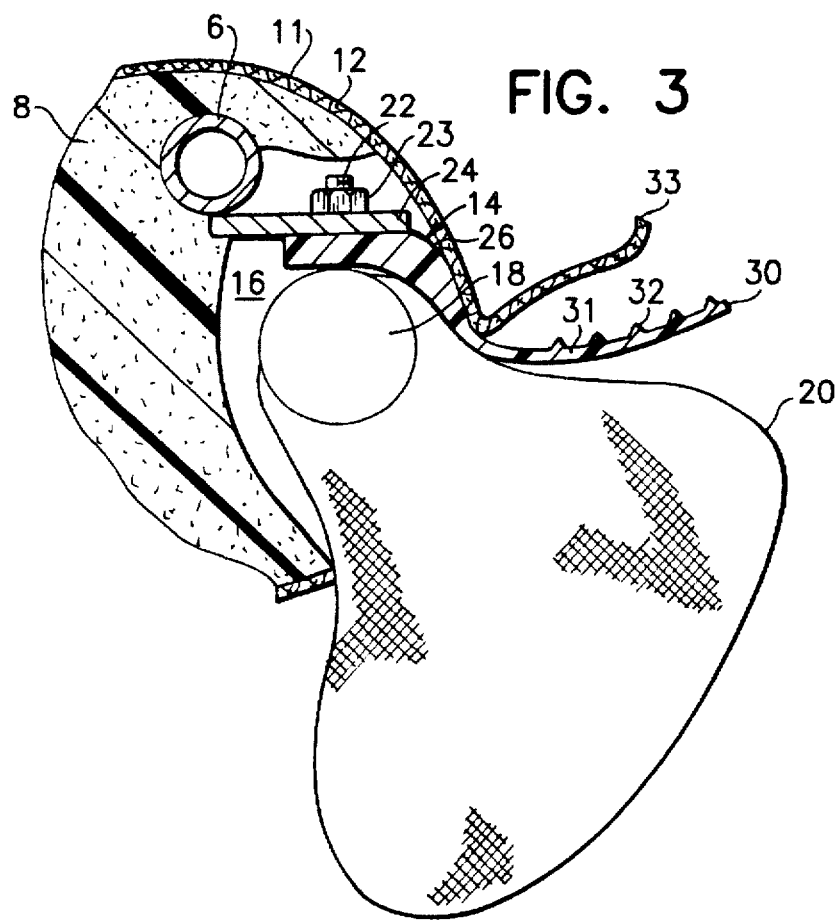
FIG. 3 is a view similar to FIG. 2 but showing the airbag cushion during deployment, the cushion having ruptured the frangible access opening adjacent thereto.

The portion 31 of the deployment door 26 adjacent the distal edge 30 is formed with outwardly facing teeth 32. These teeth 32 may be in the form of extruded longitudinal ribs or individual tooth points. The teeth 32 make it possible for this portion 31 of the deployment door 26 to frictionally engage the seat cover trim fabric 12 with the result that when the inflator discharges and the airbag cushion commences to deploy, there will be a line of intense stress on the seat cover precisely at the distal edge 30 of the deployment door 26, that is, at the location of the frangible access opening 33 in the trim cover 12. At this line (FIG. 3), frangible access opening 33 will be ripped, ruptured or otherwise split open so that the seat trim cover 12 is hinged open. The distal edge 30 of the door 26 thus assists in the opening of the trim cover 12. As the airbag cushion forces its way out, it throws wide open the flexibly resilient thinner portion 31 of deployment door 26 giving a broad berth for the deployment of the airbag.

In one form, the deployment door may be composed of two different plastics, one more resilient than the other with the more resilient plastic more proximate the distal edge. The deployment door may be made in one or two steps using known molding or extrusion techniques.

With the deployment door of this invention there is no need for the presence of tear seams in the door itself. Moreover, the single design of the deployment door permits its use in either left or right hand sides of seats without the need for any modifications of the door itself.

Further variations in the invention are possible. Thus, while the invention has been shown in only one embodiment, it is not so limited but is of a scope defined by the following claim language which may be broadened by an extension of the right to exclude others from making, using or selling the invention as is appropriate under the doctrine of equivalents.

We claim:

1. A side-impact airbag assembly adapted to mount on an internal structural member in a recess of a vehicle seat, the seat having a body defining said recess for receiving the airbag assembly and having an exterior seat trim cover defining a frangible access opening to said recess, the side-impact airbag assembly comprising:

a. an inflatable airbag cushion mounted in inflation fluid communication with an inflator so that inflation gas from the inflator, when activated, inflates the inflatable airbag cushion, b. securing means for mounting the inflatable airbag cushion and inflator to the internal structural member in the recess;

c. a one-piece, unitary deployment door of resilient material secured along a first edge portion thereof to the securing means and projecting over the airbag cushion and inflator to comprise a deployment door surface portion overlayable by the seat trim cover for shaping the seat trim cover in the area of the recess to smoothly conform with the shape of adjacent parts of the seat trim cover, the door having a distal edge opposite the first edge portion, said distal edge being approximately alignable with the frangible access opening in the seat trim cover.

2. A side-impact airbag assembly as claimed in claim 1 wherein the deployment door is of plastic material and is thicker toward the first edge portion and thinner adjacent the distal edge.

3. A side-impact airbag assembly as claimed in claim 1 wherein the securing means comprises a bracket securable to the internal structural member of the seat and having apertures receiving mounting studs of the inflator, with the first edge portion of the deployment door being secured between the bracket and the inflator.

4. A side-impact airbag assembly as claimed in claim 1 wherein the deployment door has a surface portion adjacent its distal edge and faceable toward the outer trim cover, said surface portion having teeth grippingly engageable with the outer trim cover adjacent the frangible access opening.

5. A side-impact airbag assembly as claimed in claim 1 wherein the deployment door comprises a door composed of two different plastic materials, a first more rigid plastic material proximate the first edge portion and a second more resilient plastic material proximate the distal edge.

6. A side-impact airbag assembly as claimed in claim 1 wherein the securing means comprise a bracket secured to the internal structural member of the seat, the inflator has threaded mounting studs thereon, the deployment door and the bracket each have mounting apertures formed therein and the threaded mounting studs of the inflator extend through the mounting apertures in both the deployment door and bracket, into nuts securing the deployment door and inflator to the bracket.

7. A deployment door for a side impact airbag assembly comprising an inflator and a folded, inflatable airbag cushion connected thereto and disposed thereagainst to define a module, the module adapted to be disposed in a recess in a vehicle seat and mounted to an internal structural member of the seat, said seat having an exterior trim cover, the seat trim cover defining a frangible access opening, the deployment door comprising:

a sheet of flexible material adapted to curve partly around the module and be overlain by the trim cover of the seat for shaping the trim cover in the area of the recess to smoothly conform with adjacent parts of the seat trim cover, the door having a securing margin adapted to be clamped between the inflator and the internal structural member of the seat and having a distal edge opposite the securing margin, with said distal edge adapted to be alignable with and proximate the frangible access opening in the seat trim cover.

8. A deployment door as claimed in claim 7 wherein the door is thicker at its securing margin and is thinner and more flexible at its distal edge.

9. A deployment door as claimed in claim 7 wherein the door further comprises, adjacent its distal edge on a side thereof adapted to face the seat trim cover, teeth adapted to grip the trim cover.

10. A deployment door as claimed in claim 7 wherein the securing margin of the door is formed with spaced apertures adapted to receive fastener elements for securing the module to the internal structure of the seat.

11. A deployment door as claimed in claim 7 wherein the door comprises a door composed of two different plastic materials, the first a rigid plastic material proximate the securing margin and the second a more flexible plastic material proximate the distal edge.

12. A deployment door as claimed in claim 7 wherein the longitudinal cross-section of the door is generally in the shape of the letter "J".

13. A deployment door as claimed in claim 7 wherein the door is a molded plastic door.

14. An airbag cushion deployment door for mounting directly under a seat trim cover of a seat of a vehicle and adjacent a frangible access opening in the seat trim cover and partly around an airbag module in a recess opening in the seat, the deployment door comprising:

a flap of plastic having in a longitudinal direction a generally J-shaped cross-section, said flap of plastic having a securing margin and an opposite distal edge, the flap being more resilient toward the distal edge and more rigid toward the securing margin and having formed, on an outside surface of said flap a plurality of teeth adapted to grip the seat trim cover in a position adjacent the frangible access opening.

15. An airbag cushion deployment door as claimed in claim 14 wherein the securing margin of the door is formed with spaced apertures adapted to receive fastener elements for securing the airbag module to an internal structural element of the seat.

16. An airbag cushion deployment door as claimed in claim 14 wherein the door comprises a door composed of two different plastic materials, the first a rigid plastic material proximate the securing margin and the second a more flexible plastic material proximate the distal edge.

17. A vehicle seat assembly comprising:

a vehicle seat having an internal structural member, a body defining a recess adjacent the structural member and an exterior seat trim cover over the body, said trim cover defining a frangible access therein to the recess, and a side-impact airbag module assembly disposed in the recess and comprising:
  a. an inflatable airbag cushion mounted in inflation fluid communication with an inflator so that inflation gas from the inflator, when activated, inflates the inflatable airbag cushion.
  b. securing means for mounting the inflatable airbag cushion and inflator to the internal structural member;
  c. a one-piece, unitary deployment door of resilient material secured along a first edge portion thereof to the securing means and projecting partially over the airbag cushion and inflator and comprising a surface portion overlayable by the seat trim cover for shaping the seat trim cover in the area of the recess to smoothly conform with the shape of adjacent parts of the seat trim cover, the door having a distal edge opposite the first edge portion, said distal edge being approximately alignable with the frangible access opening in the seat trim cover.

18. A vehicle seat assembly as claimed in claim 17 wherein the deployment door is of plastic material and thicker toward the first edge portion and thinner adjacent the distal edge.

19. A vehicle seat assembly as claimed in claim 18 wherein the securing means is a bracket securable to the internal structural member of the seat and having apertures for receiving mounting studs of the inflator, and the first edge portion of the deployment door being secured between the bracket and the inflator.

20. A vehicle seat assembly as claimed in claim 19 wherein the surface portion of the deployment door adjacent the distal edge has teeth grippingly engageable with the outer trim cover adjacent the frangible access opening.

* * * * *